Feb. 24, 1948.  W. T. STEPHENS  2,436,407
FLUID-TIGHT JOINT
Filed Jan. 9, 1945  2 Sheets-Sheet 1

Inventor
WILLIAM T. STEPHENS
By Leech & Radue
Attorney

Feb. 24, 1948.  W. T. STEPHENS  2,436,407
FLUID-TIGHT JOINT
Filed Jan. 9, 1945   2 Sheets-Sheet 2

Inventor
WILLIAM T. STEPHENS
By Leech & Radue
Attorneys

UNITED STATES PATENT OFFICE 2,436,407

FLUID-TIGHT JOINT

William T. Stephens, Cleveland, Ohio, assignor to Hydraulic Control Engineering Company, Cleveland, Ohio, a corporation of Ohio Application January 9, 1945, Serial No. 572,031

3 Claims. (Cl. 220—46)

This invention relates to fluid-tight joints and more particularly to such joints between telescoping cylindrical parts.

It is a general object of the present invention to provide a simple and effective fluid-tight joint between telescoping parts of a high pressure vessel which is readily made or separated with a minimum of labor and requirements for equipment.

More particularly, it is an object of the invention to provide a joint between telescoping parts, one of which includes a straight walled cylinder, in which one of the parts is provided with a circumferential channel for the reception of a sealing means compressed therein to be deformed into contact with the confronting surface of the other telescoping part and in which the mechanical connection is effected by means of a cylindrical wire engaged in preformed grooves in the two telescoping surfaces which grooves cooperate to form a tunnel for the reception of this wire.

An important feature of the invention resides in the configuration of the cooperating preformed grooves in order to accommodate variations in groove positioning within the limits of manufacturing tolerance.

Another important feature of the invention, and illustrated in several embodiments, is the provision of passages tangential to the wire tunnel for introducing and removing the securing wire.

Other and further important objects and features of the invention will be more apparent to those skilled in the art upon a consideration of the accompanying drawings and following specification wherein are disclosed several exemplary embodiments of the invention with the understanding that such modifications and combinations thereof may be made as fall within the scope of the appended claims without departing from the spirit of the invention.

Numerous types of joints have been proposed for the parts of high pressure vessels as for securing heads in positions on cylinders, the interiors of which are subjected to high fluid pressures, but most of these have been relatively complex in form in order to provide the necessary fluid-tight sealing means and the mechanical connection to resist the tremendous pressure. Joints of the screw threaded type are not only costly to manufacture in the larger sizes and with the harder metals but require special and cumbersome tools for assembly and disassembly. They are hard to make fluid-tight because of the shearing action between the rotating parts where they act on a gasket or like sealing means. Bolted or flange-type joints in common with the screw type joints require an increase in size of the metal parts to receive the fastenings and thus expensive machine work and difficult assembly operations are involved.

In accordance with the present invention the joint is materially simplified in that the cylinder walls can be straight and continuous without necessitating any thickening, flanging, threading or the like. The cylinder head or other device to be attached can be a simple plug with a shoulder to limit inward movement or can be an extremely simple cap having a cylindrical wall not substantially thicker than that of the cylinder itself. Only a normally machined telescoping fit between parts is required and after they are placed together by hand the connecting means in the form of a wire is readily inserted. It is equally as readily withdrawn for opening the joint but does not tighten with age or corrosion to resist removal.

Figure 1:
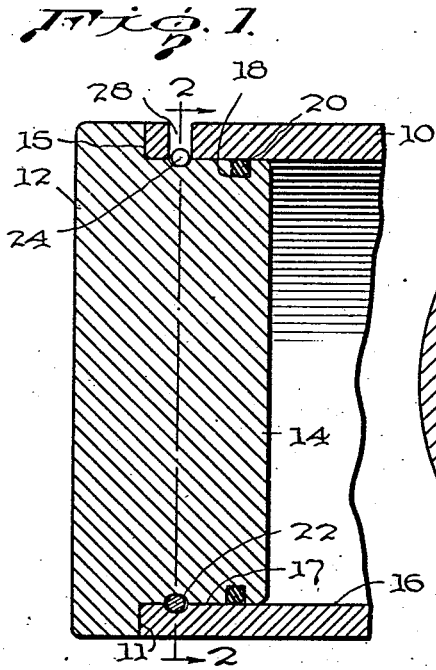
Fig. 1 is a diametric longitudinal section through a joint constructed in accordance with one embodiment of this invention between a plug-type head and the walls of a cylinder.

Referring now to the drawings and particularly to Fig. 1 the joint will be seen to be formed between the simple cylinder or sleeve 10, having straight walls and an end cut off normal to its axis in a straight transverse cut as seen at 11. The cylinder head 12 is a simple plug having an overall diameter the same as that of the tube 10 and having a reduced section 14 adapted to fit closely in the interior of the cylinder 10 for a distance which need not be more than a fraction of the diameter of the cylinder bore. The surface or shoulder 15 between the two diameters of the plug is preferably radial and abuts the end 11 of the tube to limit inward movement. The telescoping surfaces 16 and 17, respectively, of the cylinder and plug are just a close machine fit so that they can be assembled without the need of a press. One of these surfaces is provided with a channel 18 preferably of rectangular or square cross-section. For convenience it is turned in the outer surface of the plug and receives a circular sealing element 20 of such cross-sectional diameter that when compressed in the groove it is sufficiently deformed to extend partially beyond the surface 17 whereby in assembling the parts a sealing engagement is had with the surface 16.

To insure a continuous tight joint the material of the sealing ring 20 is swellable when contacted by the liquid in the cylinder.

Spaced from the sealing channel, and more remote from the interior of the cylinder in the path of any liquid which might endeavor to pass from within the cylinder toward the outside of the head, is a tunnel 22 composed of mating, preformed, substantially semi-circular grooves in the surfaces 16 and 17. This tunnel receives a wire 24 of a diameter to closely engage the inner and outer walls of the tunnel to prevent the cylinder and head from moving relatively longitudinally under the action of pressure therein. The maximum cross-sectional dimension of the wire lies in the line of junction between the cylinder and head and thus its greatest area is subject to shear throughout substantially its full length thus providing great resistance to the pressure in the cylinder.

Figure 8:
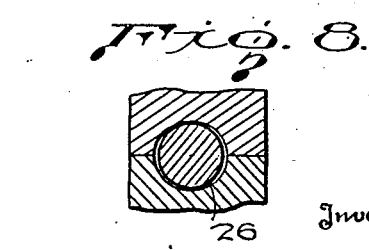
Fig. 8 is a fragmentary section transverse to the wire in its tunnel and shown on an enlarged scale.

As shown in Figure 8 it is desirable that the two grooves combining to form the tunnel 22 be not exactly semi-circular in form. Each groove 26 is preferably arcuate but somewhat less than 180° in extent so that the tunnel, in cross-section, is elliptical with its minor axis lying in a radial plane passing through the center of the whole tunnel. The diameter of the wire is substantially the same as the length of this minor axis. This arrangement of the grooves admits of variations in the manufacturing tolerance so that in the event that the grooves are not exactly in register they will still form sufficient tunnel to receive the wire.

Figure 2:
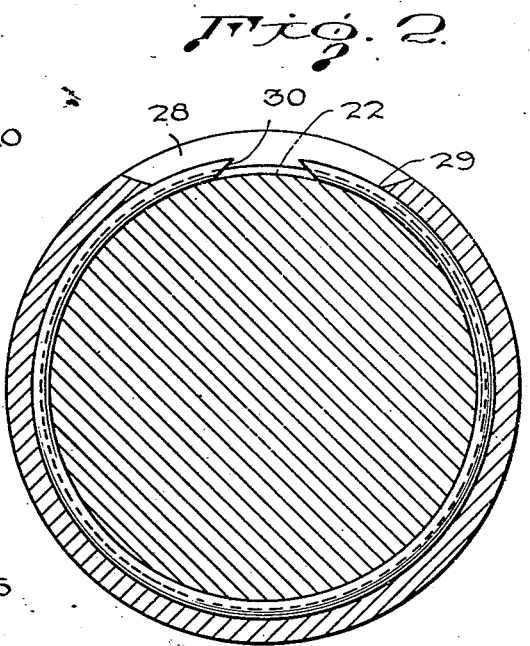
Fig. 2 is a transverse section on line 2—2 of Fig. 1.

As seen in Fig. 2 a duct is provided for introducing the wire into the tunnel by connecting a short length of the groove in the cylinder to the surface as seen at 28. This segment should be of such length that a straight portion of wire can readily be introduced tangentially into the mouth of the tunnel as at 29 and forced around until the opposite end appears at the further side of the groove extension 28. The wire may then be severed leaving the portion in the tunnel filling it to almost 360° of its extent. To separate the joint the wire is merely grasped with a suitable tool after bending one of the ends upwardly, which is conveniently done by prying beneath the inclined end 30. The wire may readily be withdrawn with a strong pull.

Figure 3:
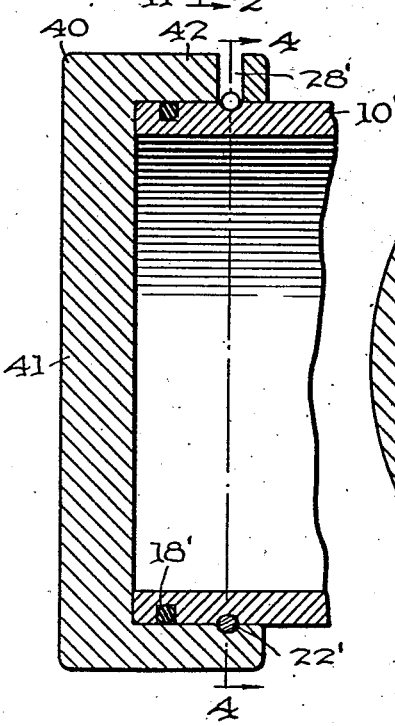
Figs. 3 and 4 are views similar to Figs. 1 and 2 but showing the joint applied to a cap-type cylinder head.
Figure 4:
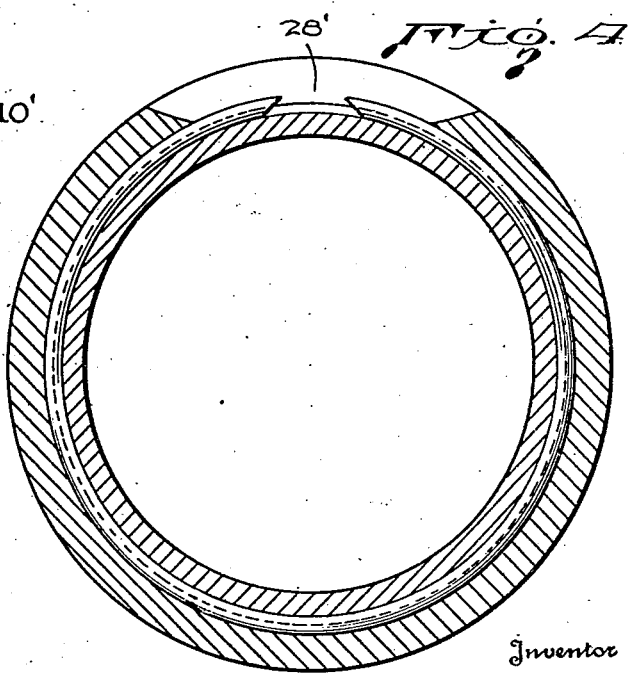

The embodiment of Figures 3 and 4 differs from that in Figs. 1 and 2 only by using a cap-type head rather than the plug-type head. Here the cap 40 includes a disc-like end wall 41 and a tubular telescoping wall 42, the interior of which is a close fit over the exterior of the straight cylinder 10'. For convenience in this construction the sealing channel 18' is again formed in the exterior surface of the telescoping parts which in this case is the cylinder wall. It is near the end of this cylinder wall and yet, as regards its position in the potential leakage path, it is closer to the interior of the cylinder than the tunnel 22' for the locking wire. The extension of the tunnel groove for the insertion of the wire is shown at 28' in the cylindrical wall of the cap for reasons which will be obvious.

Figure 5:
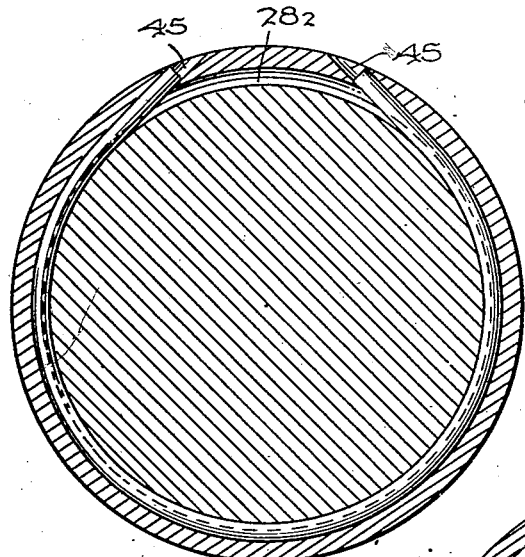
Figs. 5 and 6 are views similar to Fig. 2 but illustrating different embodiments of wire entrance passages.

In Fig. 5 is shown another means for providing entrance for the wire into the tunnel 28². In this case a pair of holes 45 are drilled to join the tunnel tangentially and they are spaced apart approximately 15° in such a manner that the extensions of the axes thereof would intersect only a short distance beyond the surface of the cylinder. The wire can be forced into one of these openings and made of such a length that the opposite end will be partially received in the other so that the wire is finally positioned as shown in the figure and both ends are fully housed.

Figure 6:
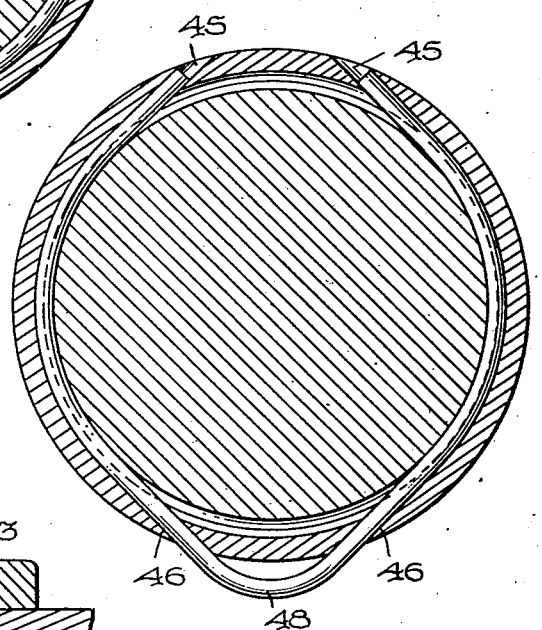

In Fig. 6 the openings 45 are present as in connection with Fig. 5 and a duplicate pair 46 are provided 180° spaced from the first pair so that the two ends of the wire may be simultaneously introduced and the whole pressed into position until the tips enter the openings 45 leaving a small bight or loop 48 which may be readily grasped by a hook or the like for withdrawing the wire when the joint is to be dismounted.

Figure 7:
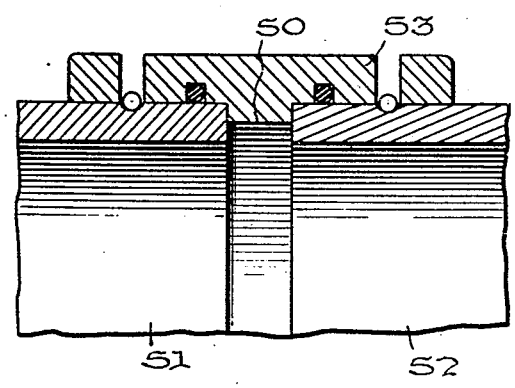
Fig. 7 is a fragmentary longitudinal section showing the joint embodied in a pipe coupling.

The cap-type of joint illustrated in Fig. 3 can with only slight modification be arranged to act as a coupling between two sections of pipe or cylinder. This is clearly illustrated in Fig. 7 and seems to require no extensive explanation. There is merely a duplication with the two cylindrical sections of the cap oppositely disposed and the disc portion drilled out so that it forms a small annular port 50 adapted to provide shoulders against which the ends of the cylinders or pipes 51 and 52 abut. A further slight modification resides in forming the sealing channels both in the interior of the fitting 53 rather than in the surfaces of the cylinders, but this has no effect on the tightness of the seal or on the assembly operation. Obviously this form of fitting may have the open segment for introducing the wire or may have arrangements as shown in Figs. 5 and 6.

It will be seen that in common all of the joints make use of preformed grooves in both telescoped parts which combine to form a tunnel for the close reception of the locking wire and that in every case this wire is more remote from the interior of the chamber than is the sealing means.

I claim:

1. A separable fluid-tight connection between partially telescoped parts comprising a straight walled cylinder and a fitting therefor having corresponding straight walls telescoping closely therewith and a shoulder abutting the end of the cylinder, swellable sealing means embedded below one of the contacting telescoping surfaces and adapted to engage the other, a groove of substantially semi-circular cross-section preformed in each of said surfaces at a position more remote than the sealing means from the interior of the cylinder, said grooves cooperating to form a tunnel of substantially circular cross-section entirely around said joint and a relatively rigid circular wire substantially filling the cross-section of the tunnel for most of its length, the outer of the telescoped parts being provided with a pair of closely spaced, oppositely directed bores tangential to said tunnel for the introduction and removal of said wire.

2. A separable fluid-tight connection between partially telescoped parts comprising a straight walled cylinder and a fitting therefor having a shoulder abutting the end of the cylinder, swellable sealing means embedded below one of the telescoping surfaces and adapted to engage the other, a groove of substantially semi-circular cross-section preformed in each of said surfaces at a position more remote than the sealing means from the interior of the cylinder, said grooves cooperating to form a tunnel of substantially circular cross-section entirely around said joint, a relatively rigid circular wire substantially filling the cross-section of the tunnel for most of its length, and a loop near the center of said wire extending out beyond the outer surface of the outer telescoped part for ease of removal, there being two holes in said last mentioned part arranged tangential to the tunnel and having their axes intersecting close to the outermost portion of the loop, the wire for the loop passing through said holes.

3. A readily separable fluid-tight connection between partially telescoped parts comprising a thick straight walled cylinder and a rigid, thick walled head for the same, a channel of non-circular section cut into one of the confronting surfaces, a resilient packing ring of circular section compressed in said channel to deform into contact with the other surface, a groove of semi-circular section preformed in each of said surfaces and more remote from the cylinder interior than the packing ring, said grooves cooperating to form a circular tunnel and a smooth cylindrical wire substantially filling said tunnel to secure the parts together, the outer of the telescoped parts being provided with two pairs of closely spaced, opposite directed bores tangential to said tunnel, said pairs being disposed substantially 180° apart for the introduction and removal of said wire.

WILLIAM T. STEPHENS.

REFERENCES CITED

The following references are of record in the file of this patent:

UNITED STATES PATENTS

| Number | Name | Date |
|---|---|---|
| 1,279,018 | Schoettel | Sept. 17, 1918 |
| 2,310,490 | Melsom | Feb. 9, 1943 |
| 1,734,236 | Smith et al. | Nov. 5, 1929 |
| 1,879,873 | Hopkins | Sept. 27, 1932 |
| 1,837,345 | Thomas | Dec. 22, 1931 |
| 2,092,243 | Breese | Sept. 7, 1937 |
| 2,360,732 | Smith | Oct. 17, 1944 |
| 2,318,317 | Lofgren | May 4, 1943 |

FOREIGN PATENTS

| Number | Country | Date |
|---|---|---|
| 376,519 | Great Britain | July 14, 1932 |